E. D. JENKINS.
BRAKE.
APPLICATION FILED FEB. 7, 1917.
1,283,788.
Patented Nov. 5, 1918.
2 SHEETS—SHEET 1.
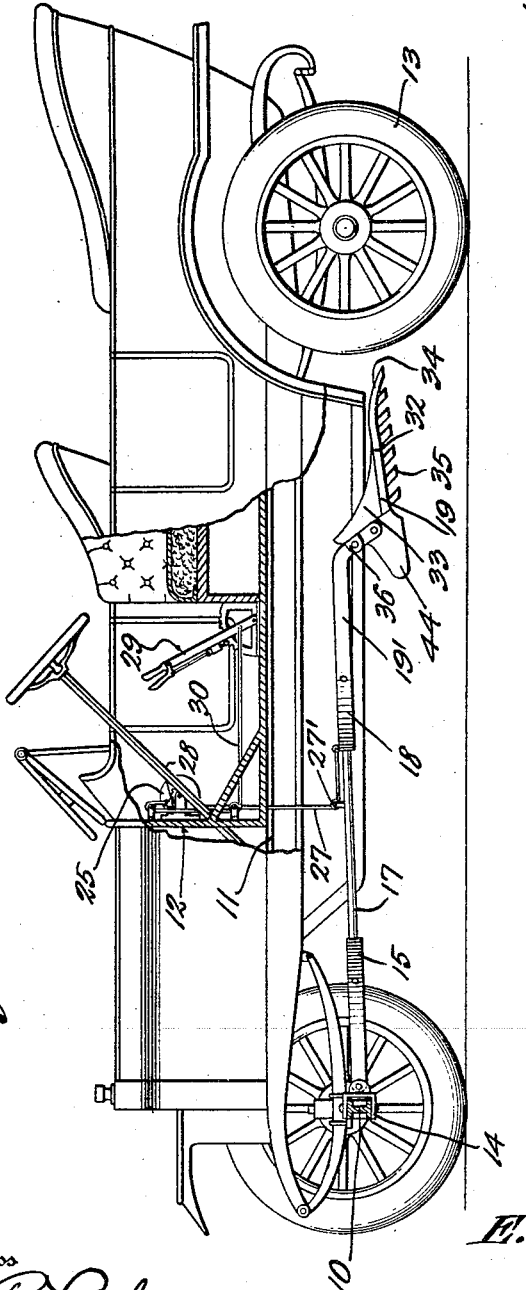
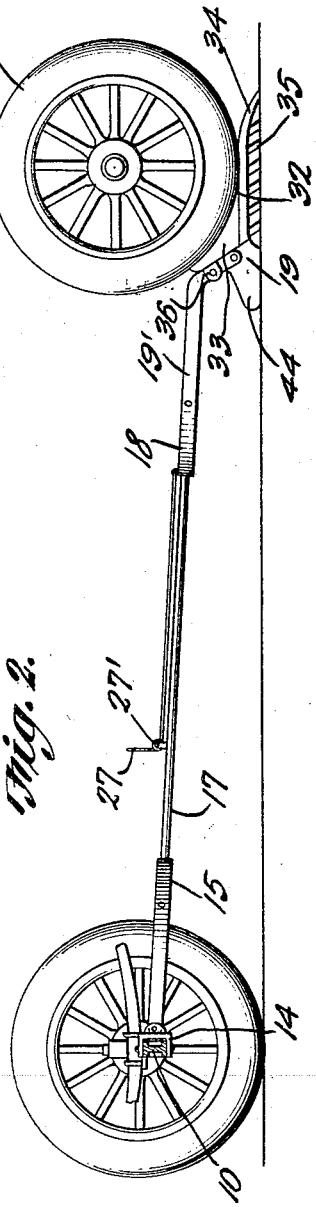
Inventor
E. D. Jenkins
By H. L. Woodward
Attorney
Witness
Ed. R. Lusby
Chr. Nilsen Jr.

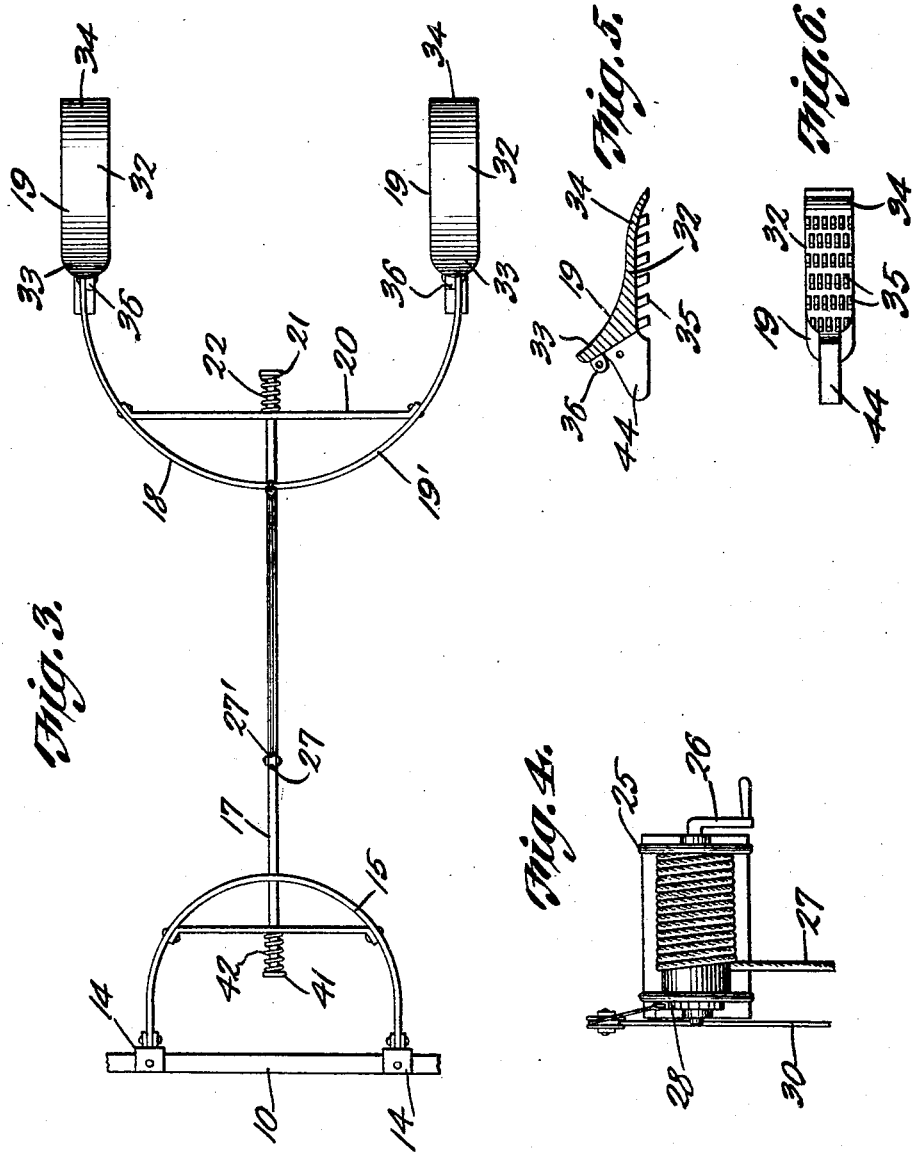

UNITED STATES PATENT OFFICE.

ELDER DWIGHT JENKINS, OF NEWFANE, NEW YORK.

BRAKE.

1,283,788.

Specification of Letters Patent.

Patented Nov. 5, 1918.

Application filed February 7, 1917. Serial No. 147,168.

*To all whom it may concern:*

Be it known that I, ELDER D. JENKINS, a citizen of the United States, residing at Newfane, in the county of Niagara and State of New York, have invented certain new and useful Improvements in Brakes, of which the following is a specification.

The invention has for an object to give a satisfactory form of brake and skid preventing device, which is especially constructed to present shoes against a ground surface of such formation as to quickly stop the car, and at the same time so shaped as to prevent the car from slipping laterally, which is of considerable importance, as where an ordinary brake device whether roughened or smooth is applied to the ground surface, abruptly, and the weight of the car supported thereon, the car will slip laterally to a considerable extent.

Additional objects are to provide a novel construction in the framing between the brake shoes at opposite sides of a vehicle, and to give a novel and desirable mounting for such a device. It is also an important aim of the invention to give a desirable and simple means for moving the device into inoperative position, and for releasing it in case of emergency.

Additional objects, advantages and features of invention will appear from the construction, arrangement and combination of parts hereinafter described and shown in the drawings, wherein, Figure 1 is a view partly in elevation, and partly in longitudinal section of a vehicle equipped with my invention, Fig. 2 is a detail of the brake and anchorage only in operation, Fig. 3 is a top plan view thereof, Fig. 4 is a detail of the raising and releasing device, Fig. 5 is a detail of one of the shoes in longitudinal section, Fig. 6 is a bottom view of one of the shoes.

There is illustrated a vehicle, the chassis of which includes the usual front axle 10, the body work 11, a dash 12, and rear driving wheels 13.

Secured to the front axle by means of suitable clips 14 there is a guide yoke 15, having a guide passage therethrough at its central part, through which there is longitudinally reciprocable the bar 17, upon the rear part of which there is reciprocable a transverse frame 18, the outer ends of which have suitably attached thereto shoe elements 19, the construction of which will be described in detail subsequently.

The frame 18 comprises a yoke bar 19′, U-shaped in plan, and a cross piece 20 by which the yoke is braced and stiffened. The bar 17 extends through the yoke and cross piece, and is provided with a head piece 21 at the rear end between which and the cross piece 20 there is disposed a heavy helical spring 22.

A hoisting drum 25 is mounted conveniently on the dash 12, adapted to be operated by means of a hand crank 26, or otherwise as may be desired, a cable 27 being extended from this drum through the floor of the vehicle, under a suitable pulley 27′ on the forward part of the bar 17, and connected to the frame 18 at a proper point to enable the frame 18 to be drawn forward and hoisted by means of the cable when wound upon the drum. The drum is provided with a suitable ratchet wheel and pawl 28 by which the drum is held against unwinding movement and this pawl is adapted to be released by means of a lever 29, with which a cable 30 extended from the pawl 28 is connected. The lever 29 may be operated by hand or by any familiar pedal construction.

The shoes 19 in the present instance comprise cast plates 32, each having an upwardly curved forward part 33, and a downwardly curved rearward part 34 suitably tapered and shaped to permit a wheel to ride easily thereon to the intermediate part of the plate. Upon the under side of the intermediate portion of the plate there is formed a multiplicity of lugs or teeth 35, all sloping longitudinally toward the rear at their lower parts, and being oblong in transverse section, their major transverse dimensions being extended longitudinally of the plates. By reason of this formation their lower ends being smoothly finished in a plane parallel with the intermediate upper surface of the shoe elongated bearing surfaces are presented. For this reason, also the ends of the teeth 35 offer greater resistance to lateral movement than to longitudinal movement upon the surface of the ground when in use. A suitable lug 36 is formed upon the forward end of each of the shoes, to which the rear ends of bars 37, comprising the terminal lateral ends of the frame 18, are bolted, or otherwise secured.

In use, the device being constructed and mounted upon a vehicle as described, in case of emergency, in order to stop the machine quickly or to prevent it from skidding and doing damage or being injured, it is only necessary to operate the lever 29, releasing the pawl 28, and permitting the cable 27 to unwind from the drum 25. The frame 18 then falls by gravity, which also tends to cause the frame 18 to move rearwardly as it falls until the shoes strike the ground immediately before the wheels 13 of the vehicle. If the full rearward movement does not occur before, engagement with the ground will insure it. As soon as the shoes engage the ground, they are drawn slightly rearwardly, the bar 17 sliding in the yoke 15 and frame 18, to permit this action. The wheels would then roll upon the shoes until they engage the upwardly inclined forward portion 33 of the shoes, when further forward movement of the wheels will be chocked, as will be readily understood. In this way, also, the force required to move the shoes forwardly against the frictional resistance of the road surface is communicated principally from the wheels, instead of the frame 18 and bar 17, with their supports, thereby avoiding liability of damage to the frame or running gear of the machine, and obviating the necessity for heavy construction in the support of the shoes. The construction mentioned has also the further advantage that in case the traction surface of the road is better at one side than at the other, the shoe exerting the greatest friction will not move rearwardly and pass beneath the engaging wheel, twisting the frame 18, and drawing the opposite shoe forwardly from beneath the adjacent wheel.

At the forward end of the bar 17 a transverse head 41 may be provided, and a suitable spring 42 engaged around the bar 17 between the head 41 and the yoke 15, so that rearward movement of the bar 17 will be yieldably resisted or cushioned, just before the shoes 19 become fully engaged beneath the rear wheels of the vehicle, the bar 17 then serving as a direct connection between the front axle 10 and the shoes 19, assisting in drawing them forwardly and obviating liability of the wheels riding over the shoes. It is desirable to extend the shoes slightly forwardly at their lower part, beyond the forward inclined portion 33, in the manner indicated at 44, or otherwise, so as to prevent tilting of the shoes when the wheels of the vehicle engage the forward part thereof.

It will be seen that a very simple construction of brake is provided, adapted to be produced at a low cost, and incorporated in a simple manner upon various forms of motor vehicles now generally in use.

What is claimed is:

1. A device of the character described comprising a vertically movable frame, a guide yoke, means for securing said guide yoke to the forward axle of a vehicle, a sliding connection between the yoke and said frame, ground engaging shoes carried by the frame at opposite sides for engagement by rear wheels of a vehicle, means for raising and lowering the frame, and means to guide the frame forwardly in upward movement and rearwardly in downward movement.

2. A device of the character described comprising a vertically movable frame, ground engaging shoes at opposite sides thereof, each constructed to receive a wheel thereupon, means for raising and lowering the frame, means for guiding the frame forwardly when raised and rearwardly when lowered, a yoke constructed for engagement with the front axle of a vehicle, a bar connected with the frame and engaged slidably in said yoke, and means to limit rearward movement of the bar in the yoke.

3. A device of the character described comprising a vertically movable frame, ground engaging shoes at opposite sides thereof, each constructed to receive a wheel thereupon, means for raising and lowering the frame, means for guiding the frame forwardly when raised and rearwardly when lowered, a yoke constructed for engagement with the front axle of a vehicle, a bar connected with the frame and engaged slidably in said yoke, and means to limit movement of the bar in the yoke, said means including a resilient element initially inoperative.

In testimony whereof I have affixed my signature in presence of two witnesses.

ELDER DWIGHT JENKINS.

Witnesses:
  JOHN B. HENNING,
  L. A. MEYER.